United States Patent
Takei et al.

(10) Patent No.: US 10,245,893 B2
(45) Date of Patent: Apr. 2, 2019

(54) PNEUMATIC TIRE

(71) Applicant: BRIDGESTONE CORPORATION, Chuo-ku, Tokyo (JP)

(72) Inventors: Ataka Takei, Saitama (JP); Yuki Watanabe, Higashimurayama (JP); Tomoaki Ito, Higashiyamato (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 607 days.

(21) Appl. No.: 14/762,907

(22) PCT Filed: Feb. 6, 2014

(86) PCT No.: PCT/JP2014/000639
§ 371 (c)(1),
(2) Date: Jul. 23, 2015

(87) PCT Pub. No.: WO2014/122932
PCT Pub. Date: Aug. 14, 2014

(65) Prior Publication Data
US 2015/0352902 A1    Dec. 10, 2015

(30) Foreign Application Priority Data

Feb. 8, 2013    (JP) .................... 2013-023578

(51) Int. Cl.
*B60C 11/03*    (2006.01)
*B60C 11/04*    (2006.01)
(Continued)

(52) U.S. Cl.
CPC ............... *B60C 11/04* (2013.01); *B60C 5/00* (2013.01); *B60C 11/0302* (2013.01);
(Continued)

(58) Field of Classification Search
CPC ......... B60C 11/0302; B60C 2011/0346; B60C 2011/0351; B60C 2011/0388; B60C 2011/1213
See application file for complete search history.

(56) References Cited

U.S. PATENT DOCUMENTS

2004/0211501 A1*  10/2004  Kajita ................. B60C 11/0306
                                                          152/209.15

FOREIGN PATENT DOCUMENTS

EP    1437238 A1 *   7/2004
EP    1440822 A1     7/2004
(Continued)

OTHER PUBLICATIONS

Machine translation for Europe 1,437,238 (Year: 2017).*
(Continued)

*Primary Examiner* — Steven D Maki
(74) *Attorney, Agent, or Firm* — Kenja IP Law PC

(57) ABSTRACT

A pneumatic tire includes a pair of circumferential grooves, a plurality of lateral grooves, and longitudinal grooves communicating between the lateral grooves on the outsides, in a tire width direction, of the circumferential grooves. Each lateral groove includes a lateral groove first portion, a lateral groove second portion disposed further outward, in the tire width direction, than the lateral groove first portion, and a lateral groove step portion connecting the lateral groove first portion and lateral groove second portion.

12 Claims, 2 Drawing Sheets

(51) Int. Cl.
    *B60C 5/00*           (2006.01)
    *B60C 11/12*        (2006.01)

(52) U.S. Cl.
    CPC ...... *B60C 11/0306* (2013.01); *B60C 11/1263* (2013.01); *B60C 2011/0346* (2013.01); *B60C 2011/0351* (2013.01); *B60C 2011/0388* (2013.01); *B60C 2011/1213* (2013.01)

(56) References Cited

FOREIGN PATENT DOCUMENTS

| | | | |
|---|---|---|---|
| JP | S55114605 A | | 9/1980 |
| JP | H01-297302 A | | 11/1989 |
| JP | 09-226324 A | * | 9/1997 |
| JP | H10-024707 A | | 1/1998 |
| JP | 11-245625 A | * | 9/1999 |
| JP | H11245625 A | | 9/1999 |
| JP | 2000-038012 A | | 2/2000 |
| JP | 2000229505 A | | 8/2000 |
| JP | 2002-036820 A | * | 2/2002 |
| JP | 2009-120055 A | | 6/2009 |
| JP | 4656239 B2 | | 3/2011 |
| JP | 2012-126214 A | | 7/2012 |
| JP | 2012-183954 A | | 9/2012 |
| JP | 5083451 B1 | | 11/2012 |

OTHER PUBLICATIONS

Machine translation for Japan 09-226324 (Year: 2017).*
Machine translation for Japan 2002-036820 (Year: 2017).*
Machine translation for Japan 11-245625 (Year: 2018).*
Mar. 18, 2014 International Search Report issued in International Patent Application No. PCT/JP2014/000639.
Mar. 18, 2014, Notification of Reasons for Refusal issued by the Japan Patent Office in the corresponding Japanese Patent Application No. 2013-023578.

* cited by examiner

PNEUMATIC TIRE

TECHNICAL FIELD

The disclosure relates to a pneumatic tire, and in particular to a pneumatic tire that can be suitably used as a winter tire.

BACKGROUND

Pneumatic tires for use on snow-covered or icy roads that have been conventionally proposed comprise, on a tread, transverse grooves each inclined toward the side opposite the rotation direction and extending from the groove starting point that terminates near the tire equator toward the outer side in the tire width direction; and inclined grooves each crossing at least two of the transverse grooves and extending at a greater angle than the transverse grooves in the same direction as the transverse grooves which the inclined groove has crossed, wherein a center land extending continuously in the tire circumference direction on the tire equator and edge lands disposed on the outsides, in the tire width direction, of the inclined grooves are defined, and a large number of sipes are provided in the center land and the edge lands. Refer for example to Patent Literature 1 (PTL 1).

CITATION LIST

Patent Literature

PTL 1: Japanese Patent No. 4656239

SUMMARY

Technical Problem

However, while the pneumatic tire described in PTL 1 demonstrates superior on-snow and on-ice performances on snow-covered and icy roads, it does not sufficiently demonstrate drainage performance in wet road surface running.

It is therefore an object of the disclosure to provide a pneumatic tire that has superior drainage performance while maintaining on-snow and on-ice performances.

Solution to Problem

The pneumatic tire of the disclosure includes, on a tread surface, a pair of circumferential grooves extending on both sides of a tire equator; a plurality of lateral grooves each extending in a tire width direction between a tread edge and a rib-shaped center land row defined by the pair of circumferential grooves; and longitudinal grooves disposed on the outsides, in the tire width direction, of the circumferential grooves and each communicating between the lateral grooves that are adjacent to each other in a tire circumference direction. Each of the lateral grooves includes a lateral groove first portion, a lateral groove second portion disposed further outward, in the tire width direction, than the lateral groove first portion, and a lateral groove step portion connecting the lateral groove first portion and the lateral groove second portion. A groove width center of the outer end, in the tire width direction, of the lateral groove first portion is disposed closer to one tire circumferential side than a groove width center of the inner end, in the tire width direction, of the lateral groove second portion. The lateral groove step portion extends at an angle relative to the tire circumference direction so as to connect the outer end, in the tire width direction, of the lateral groove first portion and the inner end, in the tire width direction, of the lateral groove second portion. The longitudinal grooves extend at an angle relative to the tire circumference direction toward the side opposite the side the lateral groove step portion extends. The end portion on the one tire circumferential side of each of the longitudinal grooves joins an area where the lateral groove second portion and the lateral groove step portion of the lateral groove on the one tire circumferential side join together. The end portion on the other tire circumferential side of each of the longitudinal grooves joins an area where the lateral groove first portion and the lateral groove step portion of the lateral groove on the other tire circumferential side join together. With the lateral grooves including the above lateral groove step portions, the edge component in the tire circumference direction can be sufficiently provided, so that running performance, particularly turning performance, can be improved while maintaining on-snow and on-ice performances. Further, with the lateral groove step portions and the longitudinal grooves arranged in the above prescribed positions, water entering the grooves can be efficiently drained to the outer sides in the tire width direction, which improves drainage performance on wet road surface, while maintaining on-snow and on-ice performances.

Regarding the longitudinal grooves, the phrase "extend at an angle relative to the tire circumference direction toward the side opposite the side the lateral groove step portion extends" means that the extending direction of the grooves is inclined, relative to the tire circumference direction, in the direction opposite the direction the lateral groove step portion extends. The term "extending direction of the grooves" refers to, when the grooves extend in a bending manner, the direction in which the center line of the amplitude extends.

Each of the longitudinal grooves preferably includes a longitudinal groove first portion, a longitudinal groove second portion disposed on the one tire circumferential side of the longitudinal groove first portion, and a longitudinal groove step portion connecting the longitudinal first portion and the longitudinal second portion. The inclination angle of the longitudinal groove step portion relative to the tire circumference direction is preferably greater than the inclination angles of the longitudinal groove first portion and the longitudinal groove second portion relative to the tire circumference direction. With the longitudinal grooves including the longitudinal groove step portions, the edge component in the tire width direction can be sufficiently provided so that driving performance can be improved.

The depth of the longitudinal grooves is preferably shallower than the depth of the circumferential grooves. By making the depth of the longitudinal grooves shallower, which is disposed further outward, in the tire width direction, than the circumferential grooves, rigidity reduction of the blocks on the outer side in the tire width direction can be suppressed. Thus, inclination of the blocks can be prevented so that turning performance as well as braking performance can be improved. When the depth of the longitudinal grooves is made shallow, water flow through the lateral grooves in wet road surface running can be further enhanced, thereby improving drainage performance.

It is further preferred that the lateral groove second portion have a part extending zigzag as seen in a planar view. With the lateral groove second portion which is provided with the part extending zigzag, the shoulder portions, which is subjected to high pressure in braking, is sufficiently provided with an edge component, so that braking performance can be improved.

Advantageous Effect

According to the disclosure, provided is a pneumatic tire that has superior drainage performance while maintaining on-snow and on-ice performances.

DETAILED DESCRIPTION

Hereinafter, the pneumatic tire of the disclosure will be described in detail with reference to the drawings.

Figure 1:
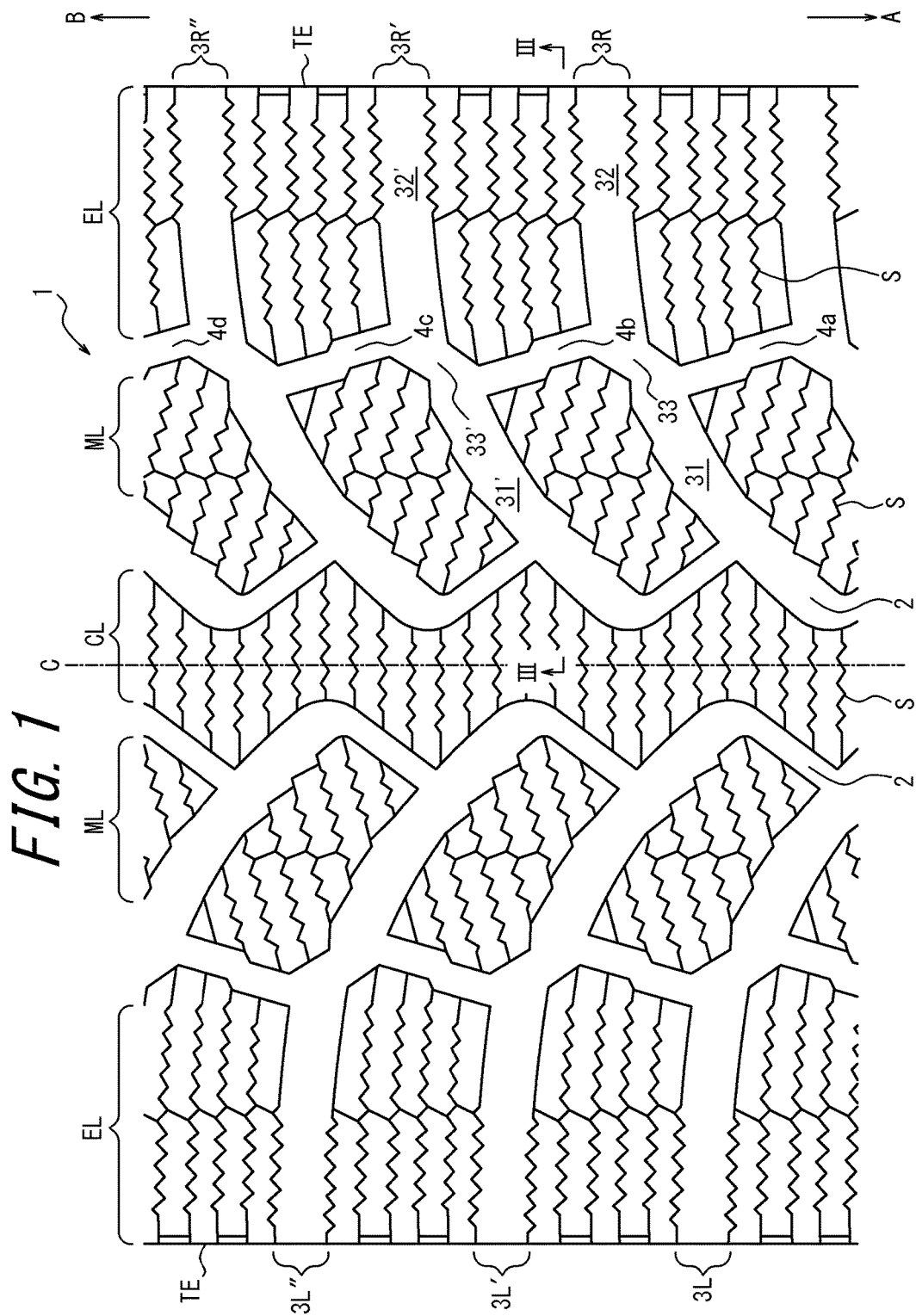
FIG. 1 is a partial plan view of an exemplary tread of a pneumatic tire according to the disclosure.

As shown in FIG. 1, a pneumatic tire 1 according to an example of the disclosure herein includes, on a tread surface, a pair of circumferential grooves 2 extending on both sides of the tire equator C, a plurality of lateral grooves 3 each continuously extending in a tire width direction between a tread edge TE and a rib-shaped center land row CL defined by the pair of circumferential grooves 2, and longitudinal grooves 4 disposed on the outsides of the circumferential grooves 2 in the tire width direction and each communicating between the lateral grooves 3 that are adjacent to each other in a tire circumference direction.

On each outside, in the tire width direction, of the center land row CL, a middle block row ML is provided that consists of a plurality of middle blocks each defined by the circumferential groove 2, the longitudinal groove 4, and the lateral grooves 3. Further, on the outside, in the tire width direction, of each middle block row ML, an edge block row EL is provided that consists of a plurality of edge blocks each defined by the longitudinal groove 4, the tread edge TE, and the lateral grooves 3.

Each of the center land row CL, the middle block row ML, and the edge block row EL includes a plurality of sipes S. The sipes S may take any shape. For example, the sipes S may be so-what is called three-dimensional sipes or two-dimensional sipes. Also, the sipes S may extend in any direction. For example, as shown in FIG. 1, a plurality of sipes S oriented in the tire with direction may be provided in the center land row CL, the middle block row ML, and the edge block row EL so as to increase an edge component in the tire width direction. Alternatively, a plurality of sipes S oriented in the tire circumference direction may be provided to increase an edge component in the tire circumference direction. By providing the sipes S as such, a scratch effect in a desired direction can be increased on a snow-covered road, so that on-snow performance can be improved.

The pneumatic tire 1 is a tire with a rotation direction that is specified by known means. In use, the pneumatic tire 1 is fitted to a vehicle to rotate downwardly in FIG. 1 when rotated in a normal direction (i.e., when moving forward).

The pair of circumferential grooves 2 extending in the tire circumference direction are bent with amplitude in the tire width direction. Specifically, as shown in FIG. 1, the circumferential grooves 2 have a zigzag shape, or specifically have bends each of which is convex toward the inside in the tire width direction between two lateral grooves 3 that are adjacent to each other in the tire circumference direction.

As shown in FIG. 1, each lateral groove 3 extends at an angle relative to the tire width direction. More specifically, the lateral groove 3 extending at an angle is bent twice toward an other tire circumferential side B. The lateral grooves 3L, 3L', and 3L" disposed on one side, in the tire width direction, of the tire equator C (i.e., the left side in FIG. 1) and the lateral grooves 3R, 3R', and 3W' disposed on the other side, in the tire width direction, of the tire equator C (i.e., the right side in FIG. 1) are both arranged in parallel in the tire circumference direction at a constant pitch. The positions where the lateral grooves 3L, 3L', and 3L", disposed on one side in the tire width direction, are arranged are half pitch off-set, in the tire circumference direction, from the positions where the lateral grooves 3R, 3R', and 3R", disposed on the other side in the tire width direction, are arranged.

Each lateral groove 3 includes a lateral groove first portion 31, a lateral groove second portion 32 disposed further outward, in the tire width direction, than the lateral groove first portion 31, and a lateral groove step portion 33 that connects the lateral groove first portion 31 and the lateral groove second portion 32.

The lateral groove first portion 31 extends to form a curve that is convex toward the other tire circumferential side B. The lateral groove first portion 31 has projections and recesses on one tire circumferential side A and on the other tire circumferential side B as seen in a planar view. More specifically, in FIG. 1, the portion of the groove wall of the lateral groove first portion 31 lying on the inner side in the tire width direction and on the one tire circumferential side A and the portion of the groove wall of the lateral groove first portion 31 lying on the outer side in the tire width direction and on the other tire circumferential side B extend with projections and recesses, as seen in a planar view.

Similarly to the lateral groove first portion 31, the lateral groove second portion 32 extends to form a curve that is convex toward the other tire circumferential side B. The lateral groove second portion 32 has a part that extends zigzag as seen in a planar view. More specifically, the portion of the groove wall of the lateral groove second portion 32 lying on the outer side in the tire width direction extends with projections and recesses as seen in a planar view. The inclination angles of the lateral groove first portion 31 and the lateral groove second portion 32 relative to the tire width direction decreases gradually toward the tread edge.

Figure 2:
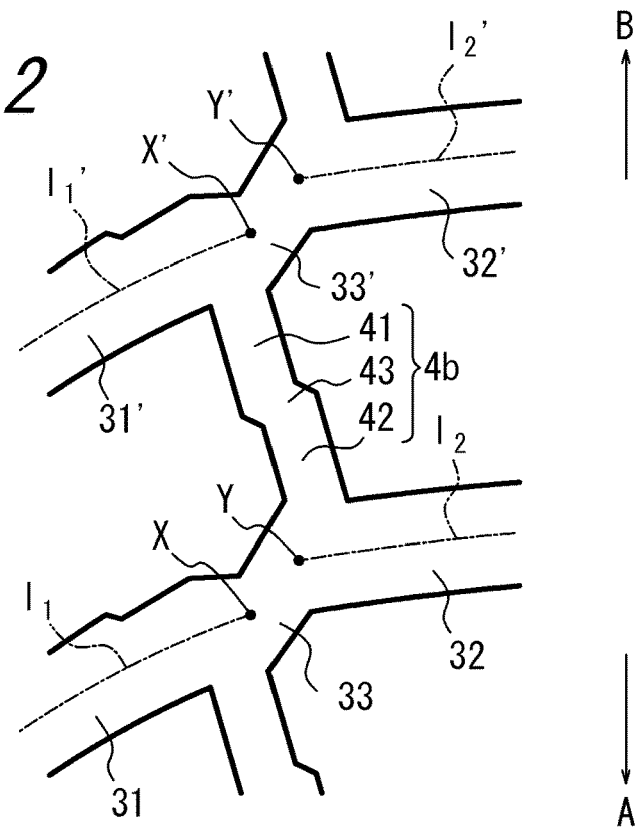
FIG. 2 is a partial enlarged view of the plan view of FIG. 1.

In this regard, as shown in FIG. 2, the lateral groove first portion 31 has a groove width center line $l_1$, and a groove width center X at the outer end, in the tire width direction, of the lateral groove first portion 31. Further, the lateral groove second portion 32 has a groove width center line $l_2$, and a groove width center Y at the inner end, in the tire width direction, of the lateral groove second portion 32. The groove width center X at the outer end, in the tire width direction, of the lateral groove first portion 31 is disposed closer to the one tire circumferential side A than the groove width center Y at the inner end, in the tire width direction, of the lateral groove second portion 32. More specifically, in FIG. 2, the groove width center X is disposed closer to the one tire circumferential side A and further inward, in the tire width direction, than the groove width center Y at the inner end, in the tire width direction, of the lateral groove second portion 32.

The lateral groove step portion 33 extends straight at an angle relative to the tire circumference direction so as to connect the outer end, in the tire width direction, of the lateral groove first portion 31 and the inner end, in the tire width direction, of the lateral groove second portion 32. More specifically, in FIGS. 1 and 2, the lateral groove step portion 33 extends at an angle relative to the tire circumference direction line toward the outside in the tire width direction. For example, the lateral groove step portion 33 extends at an angle of 20 to 70° relative to the tire circumference direction line toward the outside in the tire width direction.

The dimension of the lateral groove step portion 33 along the tire width direction is 20% or less the dimension of the lateral groove 3 along the tire width direction. For example, the dimension of the lateral groove step portion 33 along the tire width direction is 5 to 12 mm.

The longitudinal grooves 4 are bent twice and extend at an angle relative the tire circumference direction toward the side opposite the side the lateral groove step portion 33 extends. More specifically, in FIGS. 1 and 2, the longitudinal grooves 4 extend at an angle relative to the tire circumference direction line toward the inside in the tire width direction. For example, the longitudinal grooves 4 extend at an angle of 5 to 40° relative the tire circumference direction line toward the inside in the tire width direction.

The end portion of one of the longitudinal groove 4 on the one tire circumferential side A joins an area where the lateral groove second portion 32 and the lateral groove step portion 33 of the lateral groove 3R on the one tire circumferential side A join together. The end portion of the longitudinal groove 4 on the other tire circumferential side B joins an area where the lateral groove first portion 31' and the lateral groove step portion 33' of the lateral groove 3R' on the other tire circumferential side B join together.

As shown in FIGS. 1 and 2, the areas circumferentially adjacent to each other where the lateral groove first portions 31 and the longitudinal grooves 4 join together are disposed on an identical tire circumference direction line. Further, the areas circumferentially adjacent to each other where the lateral groove second portions 32 and the longitudinal grooves 4 join together are disposed on an identical tire circumference direction line.

Figure 3:
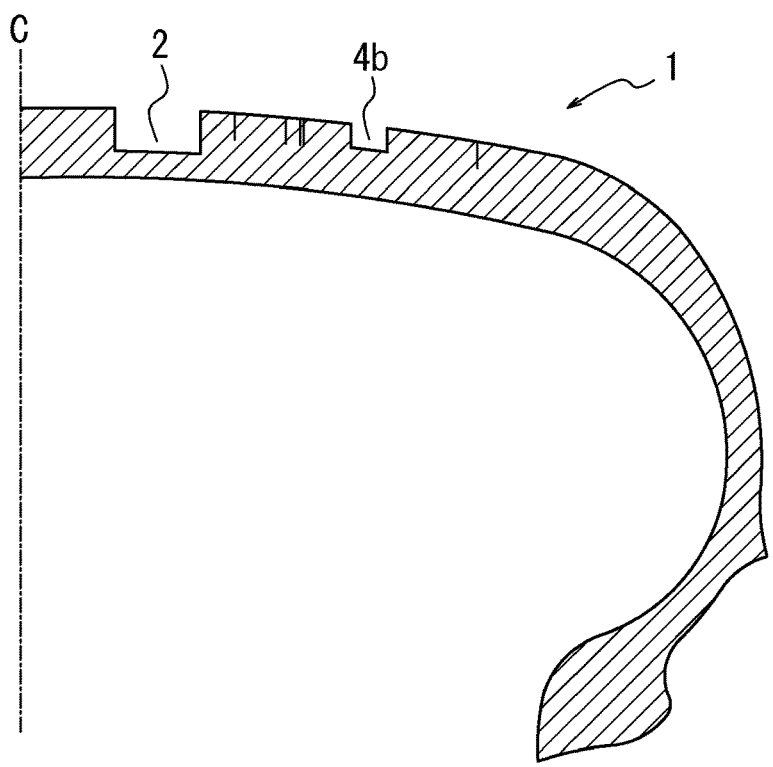
FIG. 3 is a half sectional view, in the tire width direction, of the pneumatic tire illustrated in FIG. 1, taken along the line III-III.

Still further, as shown in FIG. 3, the depth of the longitudinal grooves 4 is shallower than the depth of the circumferential grooves 2. Although not shown, the depth of the longitudinal grooves 4 may be shallower than the depth of the lateral grooves 3.

Each of the longitudinal grooves 4 includes a longitudinal groove first portion 41 disposed on the other tire circumferential side B, a longitudinal groove second portion 42 disposed on the one tire circumferential side A, and a longitudinal groove step portion 43 that connects the longitudinal groove first portion 41 and the longitudinal groove second portion 42. The inclination angle of the longitudinal groove step portion 43 relative to the tire circumference direction is greater than the inclination angles of the longitudinal groove first portion 41 and the longitudinal groove second portion 42 relative to the tire circumference direction. For example, the longitudinal groove step portion 43 is inclined, relative to the tire circumference direction line, toward the inside in the tire width direction at an angle of 50 to 90°.

The dimension of the longitudinal groove step portion 43 along the tire circumference direction is 40% or less the dimension of the longitudinal groove 4 along the tire circumference direction. For example, the dimension of the longitudinal groove step portion 43 along the tire circumference direction is 3 to 7 mm.

As described above, the pneumatic tire 1 includes the rib-shaped center land row CL at the center region of the tire tread surface. Such a pneumatic tire 1 with the rib-shaped center land row CL demonstrates superior steering stability performance particularly on dry road surface.

The center land row CL is provided with sipes S, which ensures that the edge component is sufficiently provided without lowering rigidity of the land, as compared with case where the center land row CL is provided with grooves.

The lateral groove first portion 31 and the lateral groove second portion 32 of each lateral groove 3 extend to form a curve that is convex toward the other tire circumferential side B, and the inclination angles of the lateral groove first portion 31 and the lateral groove second portion 32 relative to the tire width direction decrease toward the tread edge TE. These features allow the pneumatic tire 1 to successfully form snow columns within the lateral grooves on the tread edge sides where the inclination angle of the lateral grooves 3 is small. Thus, the pneumatic tire 1 can further improve on-snow performance.

While the lateral grooves 3 are arranged at a constant pitch, the position where the lateral groove 3L, disposed on one side of the tire equator C in the tire width direction, is arranged is circumferentially off-set from the position where the lateral groove 3R, disposed on the other side in the tire width direction, is arranged. Thus, the pneumatic tire 1 can reduce the pattern noise of tire rolling, as compared with a case where the lateral grooves 3R and 3L are arranged in line, so that noise performance can be improved.

Furthermore, in the exemplary pneumatic tire 1, the pair of circumferential grooves 2 are bent with amplitude in the tire width direction. This ensures that the edge component are sufficiently provided in both the tire width and the tire circumference directions, as compared with a case where circumferential grooves are extending straight, so that steering stability can be ensured. Furthermore, the exemplary pneumatic tire 1 allows successful formation of snow columns within the circumferential grooves 2, and improves snow column shear force to further improve on-snow performance.

The lateral grooves 3 include the lateral groove step portions 33 extending at an angle relative to the tire circumference direction. This increases the edge component with respect to the tire circumference direction and thus turning performance on snow-covered road can be improved.

In particular, the lateral groove step portion 33, which connects the lateral groove first portion 31 and the lateral groove second portion 32, can increase an edge portion of the blocks constituting the middle land row ML on the outer side, in the tire width direction, of the one tire circumferential side A. This allows the edges to scratch the road surface on the outer side in the tire width direction where ground contact area increases in turning, so that turning performance can be improved.

Further, the lateral groove first portion 31 has the projections and recesses on the one tire circumferential side A and on the other tire circumferential side B as seen in a planar view. This increases the edge component in the blocks constituting the middle land row ML and allows such edges to provide road surface-scratching effect. This also allows successful formation of snow columns within the lateral grooves 3, improving snow column shear force to further improve on-snow performance.

The lateral groove second portion 32 has the zigzag shape as seen in a planar view. This allows the edge component to be sufficiently provided to the shoulder portions, where high pressure is applied in braking. The braking performance can be thus improved.

In the pneumatic tire 1, the lateral grooves 3 each include a lateral groove step portion 33; the longitudinal grooves 4 each extend at an angle relative to the tire circumference direction toward the side opposite the side the lateral groove step portion 33 extends; the end portion of the longitudinal groove 4 on the one tire circumferential side A joins the area where the lateral groove second portion 32 and the lateral groove step portion 33 of the lateral groove 3 on the one tire circumferential side A join together; and the end portion of the longitudinal groove 4 on the other tire circumferential side B join the area where the lateral groove first portion 31' and the lateral groove step portion 33' of the lateral groove 3' on the other tire circumferential side B join together. These features allow the pneumatic tire 1 to demonstrate superior drainage performance while maintaining on-snow performance.

Specifically, in wet road surface running, water having entered the circumferential groove 2 from the one tire circumferential side A flows through the lateral groove first portion 31 and, at the area where the lateral groove first portion 31 and the lateral groove step portion 33 join together, meets water flowing through the longitudinal groove 4a to enter the lateral groove step portion 33. The water having entered the lateral groove step portion 33 is then split, at the area where the lateral groove step portion 33 and the lateral groove second portion 32 join together, into the longitudinal groove 4b and the lateral groove second portion 32. The water having entered the lateral groove second portion 32 flows to the tread edge of the tire to be drained. On the other hand, the water having entered the longitudinal groove 4b meets, at the area where the lateral groove first portion 31' and the lateral groove step portion 33' of the lateral groove 3R' on the other tire circumferential side B join together, the water having flown through the circumferential groove 2 and then the lateral groove first portion 31' to enter the lateral groove step portion 33'. The water having entered the lateral groove step portion 33' is split, at the area where the lateral groove step portion 33' and the lateral groove second portion 32' join together, into the longitudinal groove 4c and the lateral groove second portion 32'. The water having entered the lateral groove second portion 32' flows to the tread edge TE of the tire to be drained, and the water having entered the longitudinal groove 4c further enters the lateral groove 3R''. With such water flow through the grooves, the pneumatic tire 1, which has meeting points of the longitudinal grooves 4 and the lateral grooves 3, nonetheless can keep a constant inflow and outflow at the meeting points. This allows the pneumatic tire 1 to efficiently drain water, without impairing on-snow performance, allowing the pneumatic tire 1 to demonstrate superior drainage performance. In addition to making the pattern of the lateral groove step portion 33 and the longitudinal groove 4 as such, the depth of the longitudinal grooves 4 can be made shallower than the depth of the circumferential grooves 2. This would further enhance the water flow through the lateral grooves in wet road surface running, further improving drainage performance.

In the pneumatic tire 1, the longitudinal groove 4 includes the longitudinal groove step portion 43 that has a greater inclination angle, relative to the tire circumference direction, than the longitudinal groove first portion 41 and the longitudinal groove second portion 42. With this, the edge component in the tire width direction is increased so that driving performance can be improved.

With the longitudinal grooves 4 having a depth shallower than the circumferential grooves 2, rigidity of the blocks disposed on the outer side in the tire width direction, or specifically rigidity of the blocks constituting the middle land rows ML and the edge land rows EL, can be ensured. Thus, inclination of the blocks disposed on the outer side in the tire width direction can be prevented so that the ground contact area can be sufficiently provided, and thus braking performance as well as turning performance can be improved. If the depth of the longitudinal grooves 4 is made shallower than the depth of the lateral grooves 3, water flow through the lateral grooves 3 may further be enhanced in wet road surface running, and thus drainage performance can be improved.

With the longitudinal grooves 4 that extend at an angle relative to the tire circumference direction line toward the side opposite the side the lateral groove step portion 33 extends (i.e., toward the inner side in the tire width direction), the angle of the edges at the end portions, on the one tire circumferential side A, of the blocks constituting the edge land row EL is increased, as compared with a case where the longitudinal grooves 4 extend at an angle relative to the tire circumference direction line toward the same side as the lateral groove step portion 33 extends (i.e., toward the outer side in the tire width direction). This ensures that the blocks constituting the edge land row EL have sufficient rigidity. Furthermore, with the lateral groove step portion 33, acute-angled portions can be eliminated from the middle land row ML at the outer side in the tire width direction and on the one tire circumferential side A, and from the edge land row EL at the inner side in the tire width direction and on the other tire circumferential side B. This ensures that the blocks have sufficient rigidity.

In the foregoing, an example of the pneumatic tire according to the disclosure has been described with reference to the drawings. However, the pneumatic tire of the disclosure is not limited to the above example; the pneumatic tire of the disclosure can be modified as appropriate.

REFERENCE SIGNS LIST

1 Pneumatic tire
2 Circumferential groove
3R, 3R', 3R'', 3L, 3L', 3L'' Lateral groove
4a, 4b, 4c, 4d Longitudinal groove
31, 31' Lateral groove first portion
32, 32' Lateral groove second portion
33, 33' Lateral groove step portion
41 Longitudinal groove first portion
42 Longitudinal groove second portion
43 Longitudinal groove step portion
$l_1$, $l_1'$ Groove center line of the lateral groove first portion
$l_2$, $l_2'$ Groove center line of the lateral groove second portion
X, X' Groove width center of the outer end, in the tire width direction, of the lateral groove first portion
Y, Y' Groove width center of the inner end, in the tire width direction, of the lateral groove second portion
A One tire circumferential side
B The other tire circumferential side
C Tire equator
CL Center land row
ML Middle land row
EL Edge land row
S Sipe
TE Tread edge

The invention claimed is:

1. A pneumatic tire comprising, on a tread surface:
a pair of circumferential grooves extending on both sides of a tire equator;
a plurality of lateral grooves each extending in a tire width direction between a rib-shaped center land row and a tread edge, the rib-shaped center land row being defined by the pair of circumferential grooves; and
longitudinal grooves disposed on the outsides, in the tire width direction, of the circumferential grooves, each of the longitudinal grooves communicating between the lateral grooves that are adjacent to each other in a tire circumference direction, wherein
each of the lateral grooves includes a lateral groove first portion having a groove width larger than a groove width of the longitudinal grooves, a lateral groove second portion having a groove width larger than a groove width of the longitudinal grooves and disposed further outward, in the tire width direction, than the lateral groove first portion, and a lateral groove step portion connecting the lateral groove first portion and the lateral groove second portion,
a groove width center of the outer end, in the tire width direction, of the lateral groove first portion is disposed closer to one tire circumferential side than a groove width center of the inner end, in the tire width direction, of the lateral groove second portion,
the lateral groove step portion extends at an angle relative to the tire circumference direction so as to connect the outer end, in the tire width direction, of the lateral groove first portion and the inner end, in the tire width direction, of the lateral groove second portion,
the longitudinal grooves are bent twice and extend at an angle relative to the tire circumference direction toward the side opposite the side the lateral groove step portion extends,
the end portion on the one tire circumferential side of each of the longitudinal grooves joins an area where the lateral groove second portion and the lateral groove step portion of the lateral groove on the one tire circumferential side join together,
the end portion on the other tire circumferential side of each of the longitudinal grooves joins an area where the lateral groove first portion and the lateral groove step portion of the lateral groove on the other tire circumferential side join together,
an inclination angle of the lateral groove step portion relative to the tire circumference direction is smaller than inclination angles of the lateral groove first portion and the lateral groove second portion relative to the tire circumference direction,
the lateral groove first portion extends from the inner end of the lateral groove first portion, in the tire width direction, toward the other tire circumferential side, and
the lateral groove first portion and the lateral groove second portion of each lateral groove extend to form a curve that is convex toward the other tire circumferential side, and the inclination angles of the lateral groove first portion and the lateral groove second portion relative to the tire width direction decrease toward the tread edge.

2. The pneumatic tire according to claim 1, wherein
each of the longitudinal grooves includes a longitudinal groove first portion, a longitudinal groove second portion disposed on the one tire circumferential side of the longitudinal groove first portion, and a longitudinal groove step portion connecting the longitudinal groove first portion and the longitudinal groove second portion, and
an inclination angle of the longitudinal groove step portion relative to the tire circumference direction is greater than inclination angles of the longitudinal groove first portion and the longitudinal groove second portion relative to the tire circumference direction.

3. The pneumatic tire according to claim 2, wherein the inclination angle of the longitudinal groove step portion relative to the tire circumference direction is greater than the inclination angles of the longitudinal groove first portion and the longitudinal groove second portion relative to the tire circumference direction.

4. The pneumatic tire according to claim 2, wherein the longitudinal groove step portion is inclined, relative to the tire circumference direction line, toward the inside in the tire width direction at an angle of 50 to 90°.

5. The pneumatic tire according to claim 2, wherein the dimension of the longitudinal groove step portion along the tire circumference direction is 40% or less the dimension of the longitudinal groove along the tire circumference direction.

6. The pneumatic tire according to claim 1, wherein the depth of the longitudinal grooves is shallower than the depth of the circumferential grooves.

7. The pneumatic tire according to claim 1, wherein the lateral groove second portion has a part extending zigzag as seen in a planar view.

8. The pneumatic tire according to claim 1, wherein the lateral groove first portion, lateral groove step portion, and lateral groove second portion are arranged such that the lateral groove is zigzag.

9. The pneumatic tire according to claim 1, wherein a portion of the groove wall of the lateral groove first portion lying on the inner side in the tire width direction and on the one tire circumferential side and a portion of the groove wall of the lateral groove first portion lying on the outer side in the tire width direction and on the other tire circumferential side extend with projections and recesses, as seen in a planar view.

10. The pneumatic tire according to claim 1, wherein the longitudinal grooves extend at an angle of 5 to 40° relative the tire circumference direction line toward the inside in the tire width direction.

11. The pneumatic tire according to claim 1, wherein the areas circumferentially adjacent to each other where the lateral groove first portions and the longitudinal grooves join together are disposed on an identical tire circumference direction line.

12. The pneumatic tire according to claim 1, wherein the areas circumferentially adjacent to each other where the lateral groove second portions and the longitudinal grooves join together are disposed on an identical tire circumference direction line.

* * * * *